United States Patent
Nakamura et al.

(10) Patent No.: US 6,935,043 B2
(45) Date of Patent: Aug. 30, 2005

(54) SCALE DEVICE INCLUDING MEANS FOR PREVENTING THE OCCURENCE OF SMALL GAPS BETWEEN OPPOSING WALLS OF A GUIDE OPENING

(75) Inventors: Gunichi Nakamura, Kanagawa (JP); Mitsuru Ohno, Kanagawa (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

(21) Appl. No.: 10/674,634

(22) Filed: Sep. 29, 2003

(65) Prior Publication Data

US 2004/0065486 A1 Apr. 8, 2004

(30) Foreign Application Priority Data

Oct. 8, 2002 (JP) ..................................... P2002-295081

(51) Int. Cl.[7] .............................................. G01B 21/02
(52) U.S. Cl. .......................................... 33/705; 33/706
(58) Field of Search .......................... 33/703, 705, 706, 33/707, 708

(56) References Cited

U.S. PATENT DOCUMENTS

| | | | |
|---|---|---|---|
| 4,389,757 A | | 6/1983 | Luck et al. ................. 24/205.1 |
| 4,580,346 A | * | 4/1986 | Reichl ......................... 33/705 |
| 4,600,203 A | * | 7/1986 | Miller et al. ................. 33/706 |
| 4,982,508 A | * | 1/1991 | Nelle et al. .................. 33/707 |
| 5,182,867 A | * | 2/1993 | Nelle ........................... 33/705 |
| 5,485,680 A | * | 1/1996 | Nelle ........................... 33/705 |
| 6,119,357 A | * | 9/2000 | Ochiai et al. ................. 33/708 |
| 6,739,067 B2 | * | 5/2004 | Muller ......................... 33/703 |
| 2002/0026725 A1 | | 3/2002 | Kawada ....................... 33/706 |
| 2003/0200671 A1 | * | 10/2003 | Muller ......................... 33/705 |

FOREIGN PATENT DOCUMENTS

| | | | |
|---|---|---|---|
| DE | 42 16 825 A1 | 5/1992 | ........... G01B/21/16 |
| GB | 2 094 395 A | 9/1982 | ........... A44B/19/34 |
| JP | 2911746 | 4/1999 | |

* cited by examiner

Primary Examiner—G. Bradley Bennett
(74) Attorney, Agent, or Firm—Haverstock & Owens LLP

(57) ABSTRACT

In a scale device including a case member (8) having a guide opening (9) formed therein, seal lip members (12A, 12B), a carrier unit (13) having seal lip pressing means (22, 23) formed thereon, and a coupling member (16) which slides inside and relative to the guide opening (9), the seal lip members (12A, 12B) are pressed at end portions (12e, 12f) thereof by the seal lip pressing means (22, 23) in the vicinity of opposite end portions (16b, 16c) of the coupling member (16) to prevent the seal lip members (12A, 12B) from being spread. Thus, any gaps can be prevented from taking place between the seal lip members (12A, 12B) and coupling member (16) in the vicinity of the opposite end portions (12e, 12f) of the latter. Therefore, dust or the like can be prevented from entering the case member (8).

8 Claims, 6 Drawing Sheets

SCALE DEVICE INCLUDING MEANS FOR PREVENTING THE OCCURENCE OF SMALL GAPS BETWEEN OPPOSING WALLS OF A GUIDE OPENING

BACKGROUND OF THE INVENTION

1. Field of the Invention

The present invention generally relates to a scale device such as a position detector, digital scale device, encoder or the like annexed to a machine tool; industrial machine, precision machine or the like to detect positional information such as a relative travel, position and the like of a moving part of such machines. More particularly, the present invention is directed to a dustproof structure of the scale device including a case member having a scale member housed therein and a carrier unit which slides relative to the case member.

This application claims the priority of the Japanese Patent Application No. 2002-295081 filed on Oct. 8, 2002, the entirety of which is incorporated by reference herein.

2. Description of the Related Art

Generally, on machine tools, industrial machines, precision machines, etc., there is installed a scale device which detects positional information such as a travel, position, etc. of a moving part such as a table or the like. The position of the moving part is controlled based on a detection output from the scale device. The scale device includes a long scale member having an optical, magnetic or mechanical position signal provided thereon and fixed to a stationary part of a machine on which the scale device is to be used, a detector unit sliding relative to the scale member and in conjunction with a movement of the moving part of the machine, and a sensor provided in the detector unit to detect the position signal.

In the scale device, the scale member is housed in a case member fixed to the stationary part of the machine, and a carrier unit is installed to the moving part of the machine. Inside the case member, the detector unit is slidably disposed with the sensor directed opposite to a signal recording surface of the scale member, and the detector unit is coupled by a coupling member to the carrier unit. A guide opening is formed in the lateral side of the case member correspondingly to an area on the scale member where the position signal is formed, and the coupling member is slidably penetrated through the guide opening.

Since the scale member and detector unit are thus housed in the case member, the scale device is capable of high-accuracy measurement and detection with the position signal being protected against dust. The scale device has additionally provided thereon a sealing mechanism which seals the guide opening along its full length while allowing the coupling member to move slidably through the guide opening formed in the case member. There has been proposed a sealing mechanism including a pair of seal lip members which close the guide opening along its full length (see the Japanese Patent Publication No. 2911746 cited as reference herein, for example).

Referring now to FIG. 1, there is illustrated in the form of a top axial-sectional view the substantial part of the sealing structure of a conventional scale device. The scale device is generally indicated with a reference number 100. As shown in FIG. 1, the scale device 100 includes a case member 101 having a guide opening 102 formed therein, and a pair of seal lip members 103 and 104 formed from a synthetic resin or rubber and installed to inner surfaces, respectively, of the case member 101 (namely, across the guide opening 102). The slip lip members 103 and 104 are installed inside the case member 101 (namely, across the guide opening 102) for end portions 103a and 104a thereof to be in elastic contact with each other. The seal lip members 103 and 104 are in elastic contact with opposite sides of a coupling member 106 which provides a coupling between a carrier unit 105 and a detector unit (not shown). Even when the coupling member 106 slides in the guide opening 102, the seal lip members 103 and 104 are put into elastic contact, at end portions 103a and 104a thereof corresponding to the sliding distance of the coupling member 106, with the respective opposite sides of the coupling member 106 and thus keep the guide opening 102 closed.

References Cited Herein:

1. Japanese Patent Publication No. 2911746

In the scale device 100, the coupling member 106 is to move sliding in the guide opening 102 while spreading out the end portions 103a and 104a of the seal lip members 103 and 104. To this end, the coupling member 106 is shaped to have a thickness gradually reduced from the center toward opposite longitudinal ends 106a and 106b thereof in the sliding direction. Namely, it has a generally boat-shaped section.

As above, the scale device 100 is constructed such that the seal lip members 103 and 104 are in elastic contact, at the end portions 103a and 104a thereof, with the respective opposite sides of the coupling member 106 to close the guide opening 102. However, because the coupling member 106 is still thick at opposite end portions 106a and 106b thereof as shown in FIG. 2, the end portions 103a and 104a of the seal lip members 103 and 104 will not be in full elastic contact, at the end portions 106a and 106b, with the coupling member 106, which results in gaps 107a and 107b at such portions. The function of the sealing mechanism of the scale device 100 is thus impaired and dust or the like will come into the gaps 107a and 107b. The dust will possibly lower the accuracy of measurement and detection, and damage the position signal recorded on the scale member.

OBJECT AND SUMMARY OF THE INVENTION

Accordingly, it is an object of the present invention to overcome the abovementioned drawbacks of the related art by providing a scale device capable of a high-accuracy measurement and detection with the influence of dust or the like reduced by preventing any small gaps from taking place near the opposite ends of a coupling member and between seal lip members.

According to the present invention, there is provided a scale device including, according to the present invention, a scale member having position signals provided thereon; a case member having the scale member housed therein and a guide opening formed therein; a pair of seal lip members formed from a flexible sheet material and installed for end portions thereof to be in elastic contact with each other along opposite walls of the guide opening in the case member, thus closing the guide opening along the full length; a detector unit disposed inside the case member oppositely to the surface, carrying the position signals, of the case member and which detects the position signals; a carrier unit which slides relative to the case member as a moving part of a machine on which the scale device is to be used move; a coupling member penetrated through the guide opening in the case member to provide a coupling between the detector unit and carrier unit and which moves sliding in the guide opening while spreading out the pair of seal lip members as the case member and carrier unit slide relative to each other; and a pair of seal lip pressing means provided on the carrier unit at opposite sides, respectively, of the seal lip members and opposite ends, respectively, of the coupling member to press the outer lateral sides of the seal lip members between them, thereby keeping the guide opening closed.

In the above scale device according to the present invention, the thickness of the coupling member causes a force which will spread out the end portions of each seal lip member at the ends of the coupling member, that is, result in gaps between the seal lip members and coupling member. In the scale device according to the present invention, however, the seal lip pressing means press the end portions of seal lip members to prevent the end portions from being spread out in order to prevent such gaps from taking place. Therefore, according to the present invention, the seal lip members can assure the sealing of the case member so that the scale device can make a high-accuracy measurement and detection and the position signal provided on the scale member can be protected from being damaged.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

Figure 1:
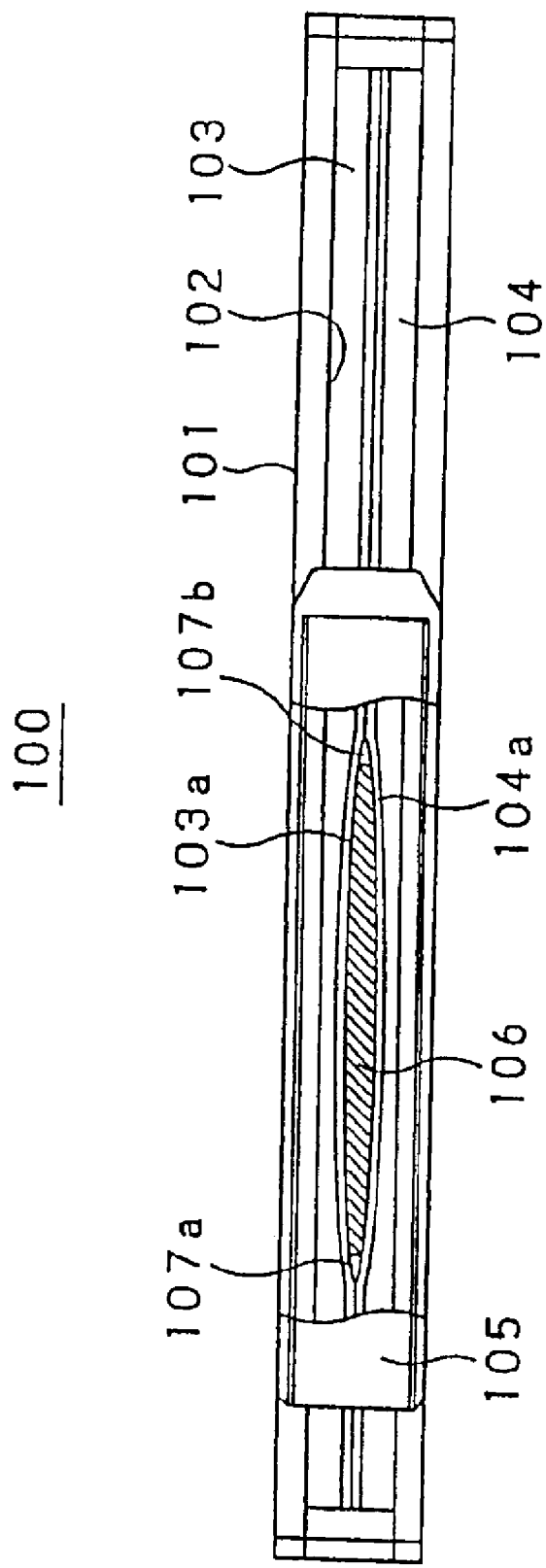
FIG. 1 is a top axial-sectional view of the substantial part of the sealing structure of the conventional scale device.
Figure 2:
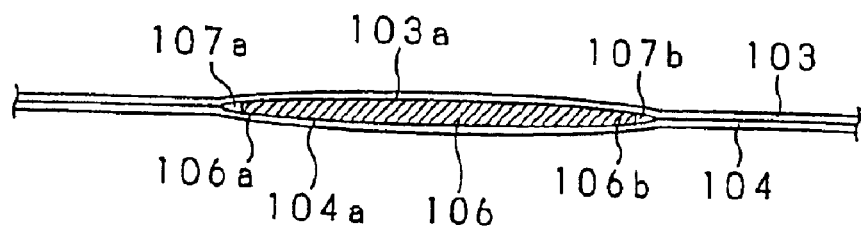
FIG. 2 is also a top axial-sectional view of the substantial part of the sealing structure of the scale device shown in FIG. 1.
Figure 3:
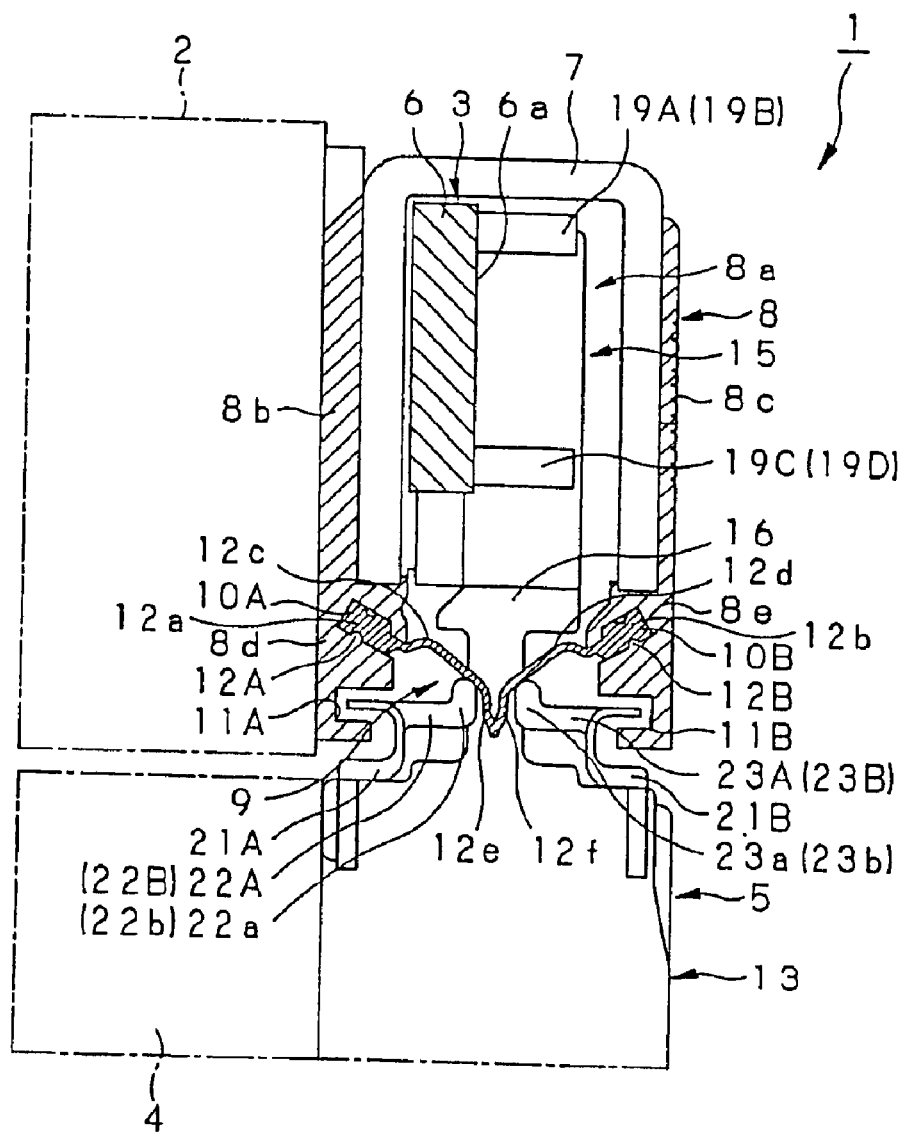
FIG. 3 is a cross-sectional view of the substantial part of the scale device according to the present invention, showing the scale device in use.
Figure 4:
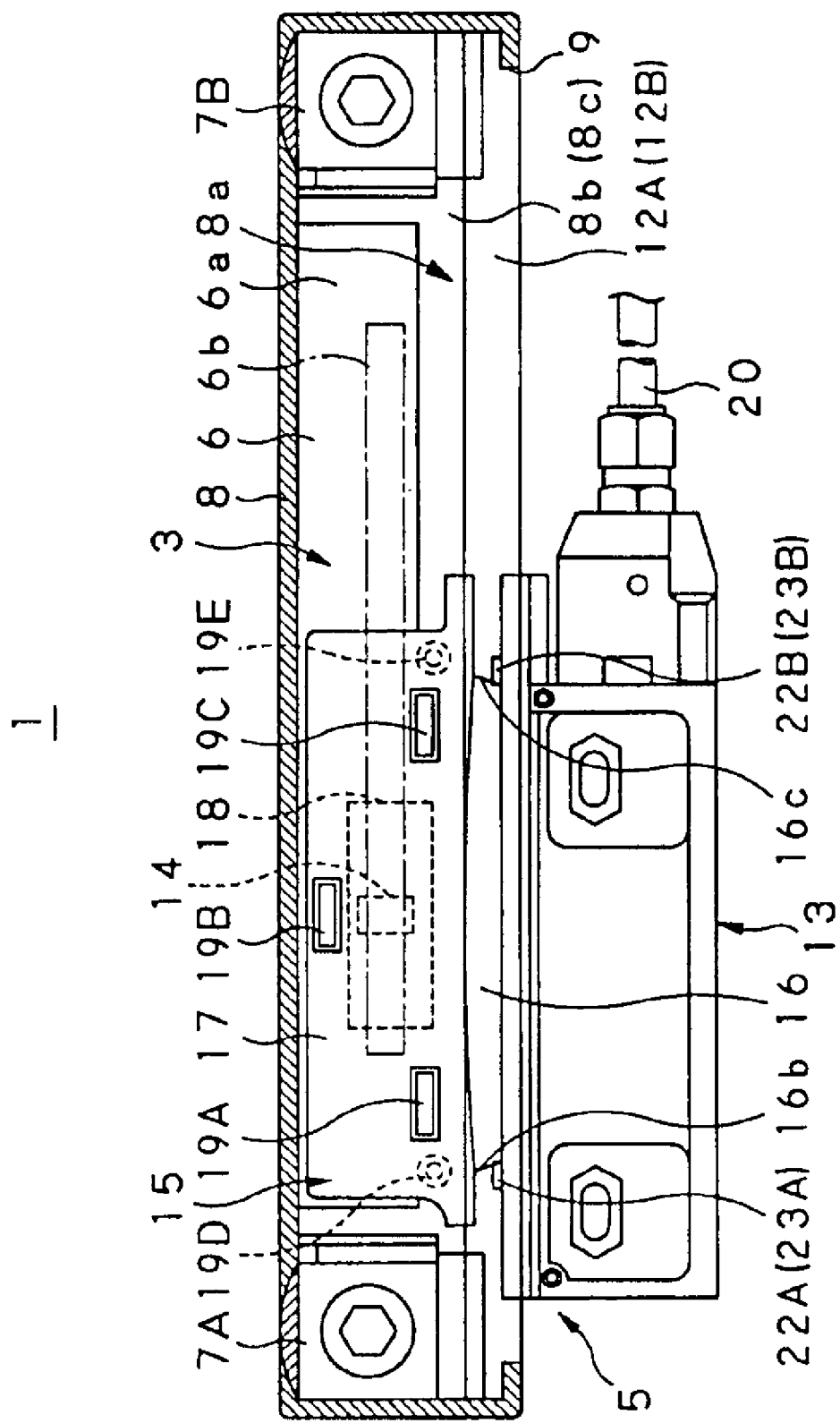
FIG. 4 is a partially fragmentary axial-sectional view of the scale device shown in FIG. 3.

The present invention will be described concerning the embodiments thereof with reference to the accompanying drawings. The scale device, generally indicated with a reference number 1, is installed to a precision machine tool, for example, to accurately detect positional information such as a travel, position, etc. of a moving part, such as a table, of the machine tool and supply the detection signal to a controller or the like in order to control the position of the moving part, for example. Referring now to FIGS. 3 and 4, the substantial part of the scale device 1 in use is illustrated in the form of a cross-sectional view and partially fragmentary axial-sectional view, respectively. As shown, the scale device 1 includes a scale unit 3 fixed to a stationary part 2 of a machine which will be described in detail herein, and a detector unit 5 fixed to a moving part 4 of the machine oppositely to the scale unit 3 and which slides as the moving part 4 moves. It should be noted that in the following explanation, the languages "top (upper)", "bottom (lower)", "right", "left", "inner" and "outer" are based on the state of the scale device 1 shown in FIG. 3.

The scale unit 3 in the scale device 1 includes mainly a long scale member 6, support members 7A and 7B to support the scale member 6 at the opposite ends, respectively, and a case member 8 housing the scale member 6 therein and having the support members 7A and 7B fitted at opposite ends thereof. The scale member 6 has an optical, magnetic or mechanical position signal formed linearly on the first main side thereof indicated with a reference number 6a. The first main side 6a will be referred to as "position signal carrying surface" hereinafter. The position signal will not be described in detail herein. Each of the support members 7A and 7B is formed to have a generally C-shaped section and the opening of the C-shaped section is directed downward as shown in FIG. 3. The scale member 6 is held at opposite ends thereof inside the support members 7A and 7B, respectively, and housed and fixed with the support members 7A and 7B in an inner space 8a of the case member 8.

As shown in FIGS. 3 and 4, the case member 8 is formed from an iron or stainless steel sheet to a sufficient length to fully cover the scale member 6 longitudinally. The case member 8 is open at the bottom thereof. Namely, the case member 8 is a channel. The case member 8 has formed at one lateral side 8b thereof a mounting portion at which the scale device 1 is fixed to the stationary part 2 of the machine, which will not be described in detail herein. The case member 8 is closed at the opposite open ends thereof with the support members 7A and 7B, respectively, with the scale member 6 being housed therein oppositely to the lateral side 8b.

The open bottom of the case member 8 provides a guide opening 9 in which the detector unit 5 slides along, and relative to, the scale member 6 as the moving part 4 moves as will further be described later. The lateral sides 8b and 8c of the case member 8 are so high as to project, as indicated with reference numbers 8d and 8e, from the bottom of the support members 7A and 7B. As shown in FIG. 3, the case member 8 has formed on the opposite inner surfaces of the projections 8d and 8e a pair of seal lip fitting recesses 10A and 10B, right and left, and a pair of holding guide recesses 11A and 11B, right and left, as will be described in detail later. The pair of seal lip fitting recesses 10A and 10B are formed above the pair of holding guide recesses. Namely, the recesses are provided in two steps, upper and lower.

The seal lip fitting recesses 10A and 10B are concavities formed opposite to each other on the opposite inner surfaces of the projections 8d and 8e of the case member 8 to have at least a length corresponding to the total length of the guide opening 9. The seal lip fitting recesses 10A and 10B extend gradually tilted down from their bottoms and open to the guide opening 9. The seal lip fitting recesses 10A and 10B have seal lip members 12A and 12B fitted therein in a cantilevered manner as shown in FIG. 3. The seal lip members 12A and 12B will be described in detail later.

The holding guide recesses 11A and 11B are formed opposite to each other in the opposite inner surfaces of the projections 8d and 8e of the case member 8. They are concavities formed parallel to the seal lip fitting recesses 10A and 10B, respectively, to have at least a length corresponding to the total length of the guide opening 9. As will be described later, when holding guide members 21A and 21B of the detector unit 5 are engaged in the holding guide recesses 11A and 11B, respectively, the latter will hold the case member 8 and a carrier unit 13 combined with each other. It should be noted that the holding guide members 21A and 21B are slidable in the holding guide recesses 11A and 11B as the carrier unit 13 slides.

The seal lip members 12A and 12B are formed from an elastic material such as rubber fluoride or polyurethane resin. As shown, the seal lip members 12A and 12B have base portions 12a and 12b which are fitted in the seal lip fitting recesses 10A and 10B, respectively, and seal portions 12c and 12d projecting from, and integrally with, the base portions 12a and 12b. In the seal lip members 12A and 12B, the base portions 12a and 12b are formed slightly thick to be rigid and the seal portions 12c and 12d are formed each like a thin sheet.

Each of the seal lip members 12A and 12B has a total length approximate to that of the guide opening 9, and each of the seal portions 12c and 12d has a height somewhat larger than a half of the width of the guide opening 9. With the base portions 12a and 12b being fitted in the seal lip fitting recesses 10A and 10B, respectively, the seal lip members 12A and 12B are secured to the case member 8 in a cantilevered manner and thus each of the seal portions 12c and 12d projects opposite to the other inside the guide opening 9.

When the base portions 12a and 12b of the seal lip members 12A and 12b are fitted in the seal lip fitting recesses 10A and 10B, respectively, inclined downward as mentioned above, the seal potions 12c and 12d are projected downward while coming nearer to each other inside the guide opening 9. The seal lip members 12A and 12B fully close the guide opening 9 longitudinally with the seal portions 12c and 12d being in elastic contact, at end portions 12e and 12f thereof, with each other as shown in FIG. 3. Thus, the seal lip members 12A and 12B effectively prevent dust or the like from entering the inner space 8a of the case member 8 through the guide opening 9.

In the scale device 1, the detector unit 5 includes units and members such as the carrier unit 13 fixed to the moving part 4 of the machine, a detector unit 15 having mounted thereon a sensor 14 which detects the position signal on the scale member 6, and a coupling member 16 which provides a coupling between the carrier unit 13 and detector unit 15, etc. The detector unit 15 includes members such as a substrate member 17 extending opposite to the position signal carrying surface 6a of the scale member 6, the sensor 14 mounted on the substrate member 17 via a sensor mounting member 18, and a plurality of guide rollers 19A to 19E as shown in FIG. 4.

The detector unit 15 is housed in the inner space 8a of the case member 8 to be freely slidable longitudinally of the scale member 6 with the sensor 14 being held a predetermined distance apart from the position signal carrying surface 6a. In the detector unit 15, when the substrate member 17 is combined with the scale member 6 in a precisely positioned relation and the sensor mounting member 18 is combined with the substrate member 17 in a precisely positioned relation, the sensor 14 can be positioned with a high precision in relation to a position signal carrying area 6b on the scale member 6.

In the detector unit 15, the plurality of guide rollers 19A to 19E is disposed near longitudinal opposite ends of the substrate member 17 and opposite to lower edge of the scale member 6, which will not be described in detail herein. Since each of the guide rollers 19A to 19E rolls on the position signal carrying surface 6a and lower edge of the scale member 6 as the moving part 4 of the machine moves, the detector unit 15 slides smoothly without pitching and rolling in relation to the scale member 6.

With the detector unit 15 sliding along the scale member 6 as the moving part 4 of the machine moves, the sensor 14 detects the position signal provided on the position signal carrying surface 6a of the scale member 6. In the detector unit 15, the sensor 14 is connected to the carrier unit 13 via a flexible cable (not shown) and sends a signal of detection of the position signal to the carrier unit 13.

The carrier unit 13 is fixed to the moving part 4 of the machine as above. The carrier unit 13 has connected thereto one end of the flexible cable from the detector unit 15 and has also connected thereto a cable 20 connected to a controller and display unit (not shown) of the machine, which is not described in detail. Thus, the signal of the position signal detection is supplied from the sensor 14 is supplied to the controller and display unit of the machine. The carrier unit 13 has the pair of holding guide members 21A and 21B provided longitudinally thereon along respective opposite top sides.

The carrier unit 13 is coupled to the detector unit 15 via a coupling member 16 as above. The coupling member 16 is formed to have a generally plate-like shape. As shown in FIGS. 3 and 4, the coupling member 16 is fixed at the top thereof to the bottom of the detector unit 15, and has a base portion 16a thereof penetrated through the guide opening 9 and fixed at the bottom to the top of the carrier unit 13. Thus, the carrier unit 13 and detector unit 15 are joined to each other. The base portion 16a of the coupling member 16 is gradually reduced in thickness longitudinally toward opposite end portions 16b and 16c. Namely, the base portion 16a is formed to have a generally boat-like section as will be known from FIG. 5.

Figure 5:
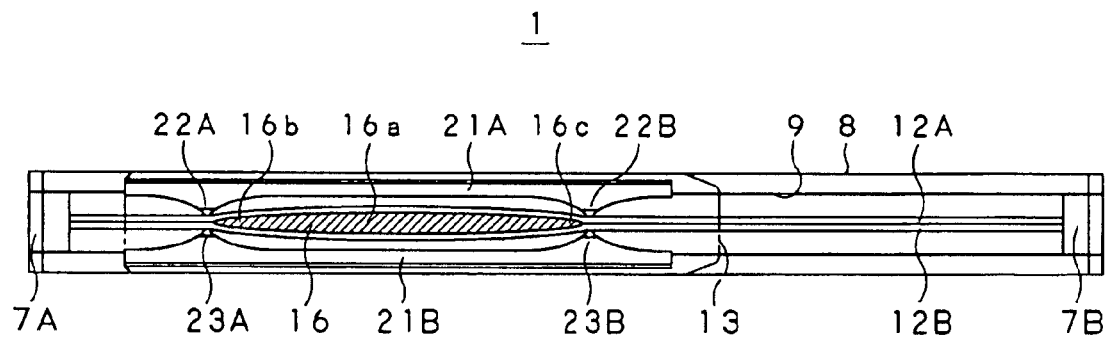
FIG. 5 is a top axial-sectional view of the substantial part of the sealing structure of the scale device shown in FIG. 3.

As shown in FIG. 5, the seal portions 12c and 12d of the seal lip members 12A and 12B are in elastic contact with the entire base portion 16a of the coupling member 16 extending through the guide opening 9. While being slid by means of the carrier unit 13 through the guide opening 9 as the moving part 4 of the machine moves, the coupling member 16 is kept in contact with the seal portions 12c and 12d by a mechanism which will be described in detail later. Thus, since the guide opening 9 is kept closed by the seal lip members 12A and 12B even while the coupling member 16 is sliding through the guide opening 9, it is possible to prevent dust or the like from entering the inner space 8a of the case member 8 and so it is assured that the scale device 1 can make a high-accuracy measurement.

The holding guide members 21A and 21B are formed from a low-friction, abrasion-resistant resin such as a Teflon (registered trademark), polyacetal resin or the like. Each of them is somewhat longer than the coupling member 16 which will further be described later, and has a generally C-shaped section as shown in FIG. 3. The holding guide members 21A and 21B are fixed at the lower ends thereof to the carrier unit 13 and engaged at the upper ends in the holding guide recesses 11A and 11B, respectively, formed in the case member 8. Thus, the holding guide members 21A and 21B are disposed opposite to each other across the seal lip members 12A and 12B as shown in FIG. 5.

Since the holding guide members 21A and 21B are engaged in the holding guide recesses 11A and 11B, respectively, the carrier unit 13 and case member 8 are held combined with each other, namely, the scale portion 3 and detector unit 5 are held combined with each other. Therefore, since the scale device 1 is of such a structure that the holding guide members 21A and 21B are engaged in the holding guide recesses 11A and 11B, respectively, and thus the scale portion 3 and detector unit 5 are not separable from each other, so it is possible to prevent dust or the like from entering the inner space 8a of the case member 8 through the guide opening 9 also when the scale portion 3 and detector unit 5 are installed to the stationary part 2 and moving part 4, respectively, of the machine, for example.

Note that although the holding guide members 21A and 21B are moved inside the holding guide recesses 11A and 11B as the carrier unit 13 is moved as will be described later, they assure a smooth movement of the carrier unit 13 and also are highly durable because they are formed from the low-friction, abrasion-resistant resin material.

The holding guide member 21A has formed integrally thereon first and second seal lip pressing portions 22A and 22B positioned near and opposite to the longitudinal opposite end portions 16b and 16c, respectively, of the coupling member 16, and projecting in the guide opening 9. As shown in FIG. 3, the first and second seal lip pressing portions 22A and 22B are formed on the holding guide member 21A to have the end portions 22a and 22b thereof disposed in somewhat outer positions than the width-directional center of the guide opening 9 as well as to be projected sufficiently for pressing the outer lateral side of the seal lip member 12A.

Also the holding guide member 21B has formed integrally thereon first and second seal lip pressing portions 23A and 23B opposite to the first and second seal lip pressing portions 22A and 22B, respectively, of the holding guide member 21A, positioned near and opposite to the longitudinal opposite end portions 16b and 16c, respectively, of the coupling member 16, and projecting in the guide opening 9. As shown in FIG. 3, the first and second seal lip pressing portions 23A and 23B are formed on the holding guide member 21B to have the end portions 23a and 23b thereof disposed in somewhat outer positions than the width-directional center of the guide opening 9 as well as to be projected sufficiently for pressing the outer lateral side of the seal lip member 12B.

As shown in FIG. 5, the first seal lip pressing portion 22A of the holding guide member 21A and first seal lip pressing portion 23A of the holding guide member 21B press and hold, between them, the seal lip members 12A and 12B at the outer lateral sides in the vicinity of the left end portion 16b of the coupling member 16 so that the seal lip members 12A and 12B are kept in elastic contact with each other. Also as shown in FIG. 5, the second seal lip pressing portion 22B of the holding guide member 21A and second seal lip pressing portion 23B of the holding guide member 21B press and hold, between them, the seal lip members 12A and 12B at the outer lateral sides in the vicinity of the left end portion 16c of the coupling member 16 so that the seal lip members 12A and 12B are kept in elastic contact with each other.

The seal lip members 12A and 12B have the seal portions 12c and 12d thereof put in elastic contact with the opposite lateral sides of the coupling member 16. The thickness of the base portion 16a of the coupling member 16 forces the seal portions 12c and 12d to be spread out in the vicinity of the opposite end portions 16b and 16c of the coupling member 16. Pressed at the seal portions 12c and 12d in the vicinity of the opposite end portions 16b and 16c of the coupling member 16 by the first seal lip pressing portion 22A of the holding guide member 21A and first seal lip pressing portion 23A of the holding guide member 21B as well as by the second seal lip portion 22B of the holding guide portion 21A and second seal lip portion 23B of the holding guide member 21B, the seal lip members 12A and 12B positively close the guide opening 9 with prevention of any gaps from taking place between the seal lip members 12A and 12B and coupling member 16.

Figure 6:
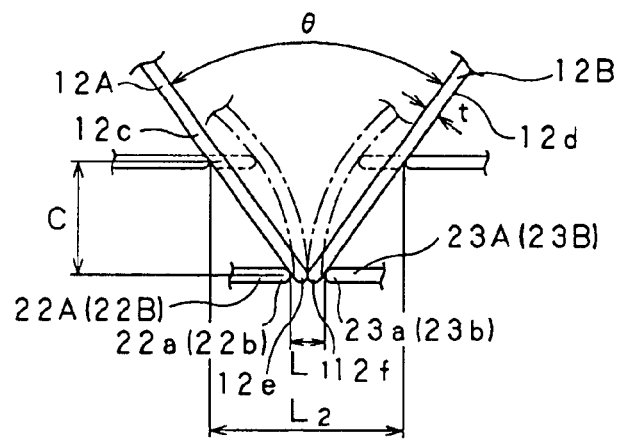
FIG. 6 explains the pressing structure of a seal lip pressing member which forces the seal lip members in the scale device shown in FIG. 3.

In the scale device 1, in case the first seal lip pressing portion 22A of the holding guide member 21A and first seal lip pressing portion 23A of the holding guide member 21B as well as the second seal lip pressing portion 22B of the holding guide portion 21A and second seal lip pressing portion 23B of the holding guide member 21B press and hold, between them, the end portions 12e and 12f of the seal lip members 12A and 12B as indicated with a solid line in FIG. 6, the seal lip pressing portions 22A and 23A in pair, namely, the seal lip pressing portions 22B and 23B in pair, will be positioned, respectively, with a gap L1 between them being given below:

$$2(t-\delta) < L1 < 2t$$

where t is the thickness of each seal lip members 12A and 12B and $\delta$ is the elastic deformation of each of the seal lip members 12A and 12B.

Pressed at the end portions 12e and 12f by the first seal lip pressing portion 22A of the holding guide member 21A and first seal lip pressing portion 23A of the holding guide member 21B, respectively, the seal lip members 12A and 12B are held in direct elastic contact with each other because the scale device 1 is constructed as above. Also, pressed at the end portions 12e and 12f by the second seal lip pressing portion 22B of the holding guide member 21A and second seal lip pressing portion 23B of the holding guide member 21B, respectively, the seal lip members 12A and 12B are held in direct elastic contact with each other in the scale device 1.

Also, in the scale device 1, in case the first seal lip pressing portion 22A of the holding guide member 21A and first seal lip pressing portion 23A of the holding guide member 21B as well as the second seal lip pressing portion 22B of the holding guide portion 21A and second seal lip pressing portion 23B of the holding guide member 21B press and hold, between them, the seal portions 12c and 12d, of the seal lip members 12A and 12B, located in predetermined positions higher than the end portions 12e and 12f, as indicated with a broken line in FIG. 6, the first seal lip pressing portions 22A and 23A in pair, namely, the second seal lip pressing portions 22B and 23B in pair, will be positioned, respectively, with a gap L2 between them being given below:

$$2(t-\delta) < L2 < C \cdot \tan \theta + 2t$$

where t is the thickness of each of the seal lip members 12A and 12B, $\delta$ is the elastic deformation of each of the seal lip members 12A and 12B, C is position pressed by the end portions 12e and 12f of the seal lip members 12A and 12B, and $\theta$ is the opening angle between the pair of seal lip members 12A and 12B.

In the scale device 1 constructed as above, the first seal lip pressing portion 22A of the holding guide member 21A and first seal lip pressing portion 23A of the holding guide member 21B cause the seal portions 12c and 12d thereof to elastically be deformed, thereby keeping the end portions 12e and 12f of the seal lip members 12A and 12B in elastic contact with each other at the one end 16*b* of the coupling member 16, as shown in FIG. 6. Also, in the scale device 1, the first seal lip pressing portion 22A of the holding guide member 21A and first seal lip pressing portion 23A of the holding guide member 21B cause the seal portions 12*c* and 12*d* thereof to elastically be deformed, thereby keeping the end portions 12*e* and 12*f* of the seal lip members 12A and 12B in elastic contact with each other at the other end 16*c* of the coupling member 16.

In the scale device 1 constructed as above, since the seal lip pressing portions 22A and 22B and seal lip pressing portions 23A and 23B press the seal lip members 12A and 12B in positions away from the end portions 12*e* and 12*f*, respectively, the sliding resistance is reduced while the durability is improved. Also, a wider range of the gap L2 between the seal lip pressing portion 22A (22B) and seal lip pressing portions 23A (23B) is allowable, which permits an easier positioning.

In the scale device 1 constructed as above, the detector unit 15 housed opposite to the scale member 6 slidably in the inner space 8*a* of the case member 8 fixed to the stationary part 2 of the machine, and the carrier unit 13 fixed to the moving part 4 of the machine, are coupled to each other by the coupling member 16 extending through the guide opening 9 formed in the case member 8 to form the detector unit 5. Also, the pair of seal lip members 12A and 12B is provided on the case member 8 and the seal portions 12*c* and 12*d* of the seal lip members 12A and 12B, respectively, are put into elastic contact with each other to fully close the guide opening 9 longitudinally and thus prevent dust or the like from entering the inner space 8*a*.

In the scale device 1, the seal portions 12*c* and 12*d* of the seal lip members 12A and 12B, respectively, are put in elastic contact with the opposite lateral sides, respectively, of the base portion 16*a* of the coupling member 16 extending through the guide opening 9 so that the seal lip members 12A and 12B keep the guide opening 9 closed also at the portions where the coupling member 16 penetrate through the guide coupling 9 and thus dust or the like is prevented from entering the inner space 8*a* of the case member 8. Also, the seal lip members 12A and 12B are pressed, in the vicinity of the opposite end portions 16*b* and 16*c* of the coupling member 16, by the seal lip pressing portions 22A and 22B and seal lip pressing portions 23A and 23B formed on the holding guide members 21A and 21B. Thus, the seal lip members 12A and 12B are held in elastic contact with each other also in the vicinity of the opposite end portions 16*b* and 16*c* of the coupling member 16.

In the scale device 1, as the moving part 4 of the machine moves in relation to the stationary part 2 of the machine, the carrier unit 13 slides with the moving part 4 along the case member 8. As the carrier unit 13 slides, the detector unit 15 is slid by the coupling member 16 along the scale member 6 inside the inner space 8*a* of the case member 8. The sensor 14 mounted on the detector unit 15 scans the position signal carrying area 6*b* on the scale member 6 and detects a position signal recorded in the position signal carrying area 6*b*. A position-signal detection output is sent from the sensor 14 to the carrier unit 13 and supplied to the controller and display unit of the machine via the cable 20.

In the scale device 1, as the detector unit 15 slides, the coupling member 16 slides inside the guide opening 9 while spreading out the seal lip members 12A and 12B. Also as the coupling member 16 slides, the seal lip pressing portions 22A and 22B and seal lip pressing portions 23A and 23B press the seal lip members 12A and 12B in the vicinity of the opposite end portions 16*b* and 16*c* of the coupling member 16 and thus the seal lip members 12A and 12B keep closing the guide opening 9. Also in case the scale device 1 is annexed to a machine tool or the like, it can make a high-accuracy measure because dust, chips, oil drops or the like can positively be prevented from entering the case member 8.

Although the scale device 1 has the holding guide members 21A and 21B provided on the carried unit 13 and the seal lip pressing portions 21A and 21B and seal lip portions 22A and 22B formed on the holding guide members 21A and 21B, respectively, as above, it is of course that the present invention is not limited to such a construction. For example, the holding guide members 21A and 21B may be formed integrally with the coupling member 16. In case the carrier unit 13 is combined with the case member 8 via any other holding guide mechanism, the holding guide members 21A and 21B may be formed integrally on the carrier unit 13. Also, the scale device 1 may be constructed with the seal lip pressing portions 22A and 22B and seal lip members 22A and 22B combined as separate members with the holding guide members 21A and 21B or formed integrally on the carrier unit 13 or combined as separate members on the carrier unit 13.

Figure 7:
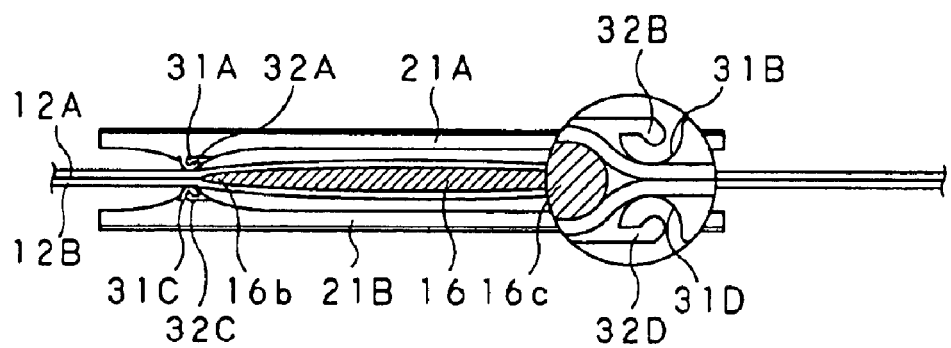
FIG. 7 is an axial-sectional view of the substantial part of another sealing structure.

FIG. 7 shows the second embodiment of the scale device according to the present invention. Similarly to the aforementioned scale device 1, this scale device generally indicated with a reference number 30 has seal lip pressing portions 31A to 31D formed integrally on the holding guide members 21A and 21B in positions corresponding to the opposite end portions 16*b* and 16*c* of the coupling member 16. The scale device 30 is characterized by that the seal lip pressing portions 31A to 31D each formed like a half-moon have slits 32A to 32D formed at the base portions thereof, respectively. It should be noted that the other construction is similar to that of the aforementioned scale device 1 and so will not be described.

The seal lip pressing portions 31A and 31C are formed in positions corresponding to one end portion 16*b* of the coupling member 16 of the holding guide members 21A and 21B and the slits 32A and 32C are open inwardly opposite to each other and parallel to the sliding direction, in other words, to the seal lip member 12A. On the other hand, the seal lip pressing portions 31B and 31D are formed in positions corresponding to the other end portion 16*c* of the coupling member 16 of the holding guide members 21A and 21B and the slits 32B and 32D are open inwardly and parallel to the sliding direction, that is, to the seal lip member 12A.

In the scale device 30 constructed as above, the coupling member 16 oscillates up and down when sliding inside the guide opening 9 in some cases. Since the seal lip pressing portions 31A to 31D are elastically deformed at the slits 32A to 32D, respectively, formed in the base portions thereof, they are held pressed to the seal lip members 12A and 12B. Therefore, the seal lip members 12A and 12B will keep the guide opening 9 closed more securely.

Figure 8:
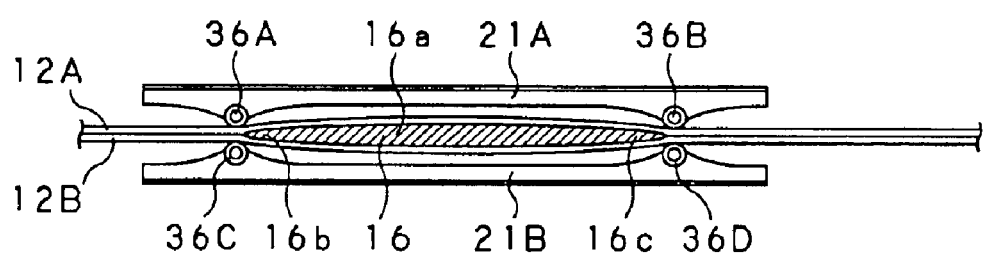
FIG. 8 is an axial-sectional view of the substantial part of still another sealing structure.

FIG. 8 shows the second embodiment of the scale device according to the present invention. The scale device generally indicated with a reference number 35. includes seal lip pressing rollers 36A to 36D provided on the holding guide members 21A and 21B in positions corresponding to the opposite end portions 16*b* and 16*c* of the coupling member 16. The seal lip pressing rollers 36A and 36C hold the seal portions 12*c* and 12*d* of the seal lip members 12A and 12B between them at a height falling within a range and in the vicinity of one end portion 16*b* of the coupling member 16. Similarly, the seal lip pressing rollers 36B and 36D hold the seal portions 12c and 12d of the seal lip members 12A and 12B between them in the vicinity of the other end portion 16c of the coupling member 16.

In the scale device 35 constructed as above, as the carrier unit 13 moves, the holding guide members 21A and 21B slide and thus the seal lip pressing rollers 36A to 36D roll while pressing the seal lip members 12A and 12B. So, the holding guide members 21A and 21B can slide with less resistance, resulting in an improved durability of the scale device 1. Also, since the seal lip pressing rollers 36A to 36D roll while pressing the seal lip members 12A and 12B at a height falling within a range, the seal lip members 12A and 12B will keep the guide opening 9 closed more securely even if the coupling member 16 oscillates up and down while sliding inside the guide opening 9 or in case the dimensional tolerance of each part is large.

Figure 9:
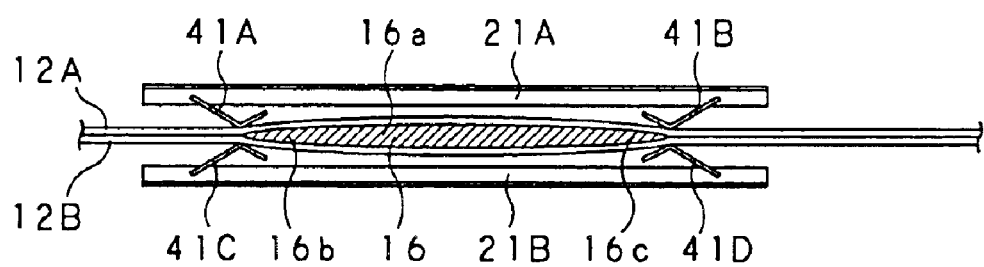
FIG. 9 is an axial-sectional view of the substantial part of yet another sealing structure.

FIG. 9 shows the third embodiment of the scale device according to the present invention. The scale device is generally indicated with a reference number 40. It has seal lip pressing members 41A to 41D provided on the holding guide members 21A and 21B in positions corresponding to the opposite end portions 16b and 16c of the coupling member 16. The seal lip pressing members 41A to 41D are formed from a spring material. They have base portions thereof fixed to the holding guide members 21A and 21B and press, at free end portions thereof, the seal lip members 12A and 12B to both sides of the base portion 16a in the vicinity of the opposite end portions 16b and 16c of the coupling member 16.

In the scale device 40, when it moves inside the guide opening 9, the coupling member 16 oscillates up and down or laterally thereof in some cases. In this scale device 40, since the seal lip pressing members 41A to 41D positively press the seal lip members 12A and 12B to the opposite lateral sides of the coupling member 16, the seal lip members 12A and 12B will keep the guide opening 9 closed more securely. Even if the dimensional tolerance of each part of the scale device 40 is large and there is some deviation in center portion of the seal lip pressing members 41A to 41D, the seal lip members 12A and 12B will positively keep the guide opening 9 closed.

Figure 10:
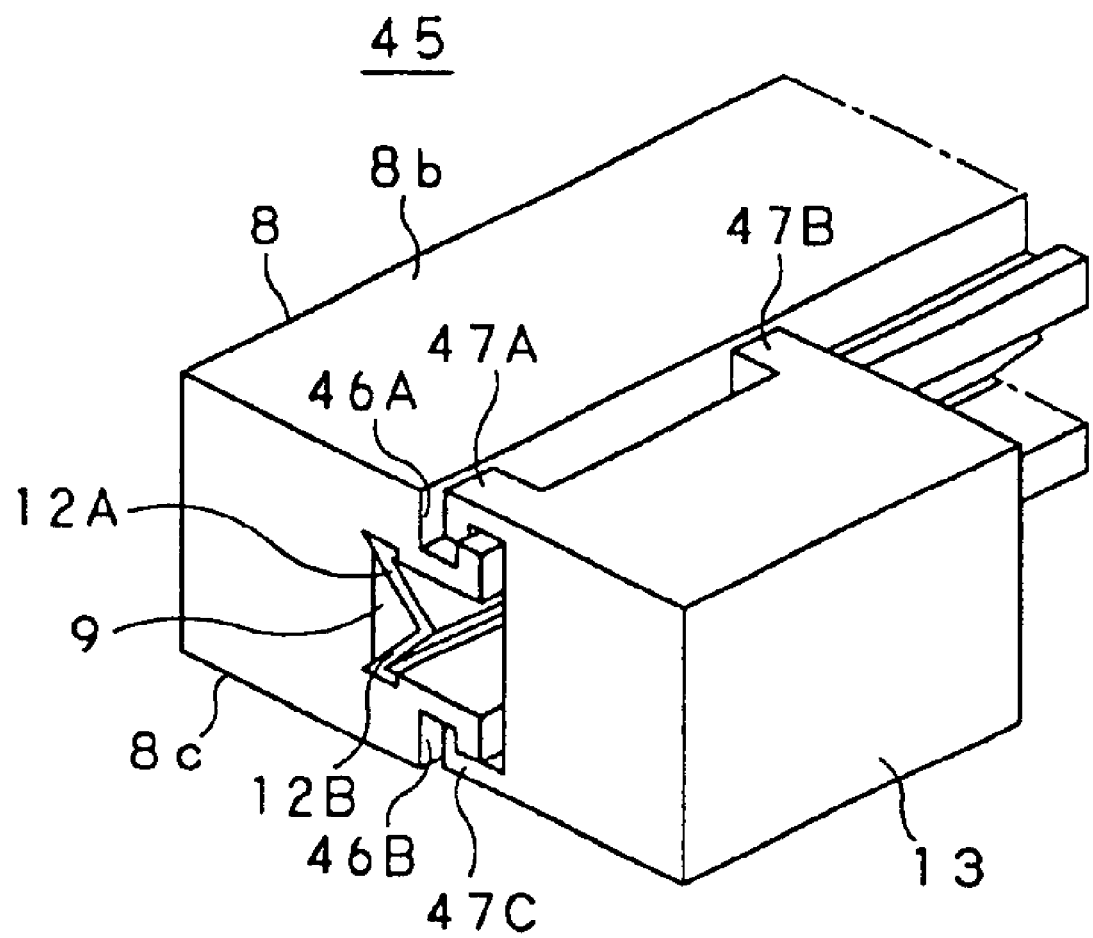
FIG. 10 is a perspective view explaining another coupling between a case member and carrier unit.

As having previously been described, the structure for holding the case member 8 and carrier unit 13 in the combined state is formed from the holding guide recesses 11A and 11B formed in the inner surface of the case member 8 and the holding guide members 21A and 21B provided on the carrier unit 13 and engaged in the holding guide recesses 11A and 11B, respectively. FIG. 10 shows the fourth embodiment of the scale device according to the present invention. The scale device generally indicated with a reference number 45 has longitudinal holding guide recesses 46A and 46B formed on opposite outer sides 8b and 8c, respectively, of the case member 8, and holding guide convexities 47A to 47D formed integrally on the carrier unit 13 correspondingly to the holding guide recesses 46A and 46B. It should be noted that since the scale device 45 is similar in basic construction to the aforementioned scale device 1, the same or similar elements as or to those in the scale device 1 will be shown with the same or similar reference numbers and will not be described any longer.

Also in the scale device 45, since the case member 8 and carrier unit 13 are not separable from each other when installing the scale device 45 to a machine, dust or the like can positively be prevented from entering the inner space 8a of the case member 8 through the guide opening 9. Also, since the guide opening 9 in the scale device 45 is exposed directly to outside, it is possible to prevent dust or the like more positively from entering the inner space 8a.

Note that in the scale devices 1 and 45, the coupling member 16 is slidable inside the guide opening 9 because the case member 8 is fixed to the stationary part 2 of the machine while the carrier unit 13 is fixed to the moving part 4 of the machine. In these scale devices 1 and 45, the case member 8 is fixed to the moving part 4 of the machine while the carrier unit 13 is fixed to the stationary part 2 of the machine as the case may be. In this case, the coupling member 16 will be stationary while the guide opening 9 will be movable. Also in this case, the intended sealing can be assured.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

In the scale device 1 (45), the case member 8 is formed to have a generally C-shaped section and the bottom thereof thus open is used as the guide opening 9. However, it is of course that the present invention is not limited to such a construction. The guide opening 9 may be formed appropriately in the case member 8 depending upon how the scale device 1 (45) is combined with a machine as well as upon how the case member 8 and carrier unit 13 are combined with each other. In any case, the guide opening 9 is formed as a longitudinal opening in the cases member 8 and the aforementioned sealing structure is provided for the guide opening 9.

Also in the scale device 1 (45), the holding guide recess 11 (46) is formed in the case member 8 and the holding guide member 21 (holding guide convexity 47) is formed on the carrier unit 13 to hold the case member 8 and carrier unit 13 in the combined state. However, it is of course that in the present invention, such a structure is not essential. In the scale device 1 (45), a suitable coupling member may be used in lieu of the aforementioned structure to provisionally hold the case member 8 and carrier unit 13 or any holding structure is not required depending upon the environment where there is installed a machine to which the scale device is to be annexed.

As having been described in detail in the foregoing, in the above scale device according to the present invention, the seal lip pressing means provided on the carrier unit in the vicinity of the opposite end portions of the coupling member which slides inside the guide opening formed in the case member and closed by the seal lip members press the seal lip members at the end portions to prevent the seal lip members from being spread out. Therefore, according to the present invention, the seal lip members can assure the sealing of the case member so that the scale device can make a measurement and detection with a high accuracy and the position signal recorded on the scale member can be protected from being damaged.

What is claimed is:

1. A scale device comprising:
   a scale member having position signals provided thereon;
   a case member for housing the scale member therein and including a guide opening formed therein having opposing walls;
   a pair of seal lip members formed from a flexible sheet material, wherein end portions of the pair of seal lip members are in elastic contact with each other along the opposing walls of the guide opening, thus closing the guide opening along a full length of the guide opening;

a detector unit disposed inside the case member for detecting the position signals of the scale member;

a carrier unit which slides relative to the case member as a moving part of a machine on which the scale device is to be used;

a coupling member penetrating through the guide opening in the case member to provide a coupling between the detector unit and the carrier unit and which slides in the guide opening while spreading out the pair of seal lip members as the case member and the carrier unit slide relative to each other; and a pair of seal lip pressing members provided on opposing sides of the carrier unit, respectively, of the pair of seal lip members and opposite ends, respectively, of the coupling member to press outer lateral sides of the pair of seal lip members, thereby keeping the guide opening closed.

2. The scale device as set forth in claim 1, wherein the pair of seal lip pressing members are provided to press the outer lateral sides of the pair of seal lip members with a gap within the range between $2(t-\delta)$ and $2t$, where t represents a thickness of each of the pair of seal lip members and $\delta$ represents an elastic deformation of each of the pair of seal lip members.

3. The scale device as set forth in claim 1, wherein the pair of seal lip pressing members are provided to press the outer lateral sides of the pair of seal lip members with a gap within the range between $2(t-\delta)$ and $C \cdot \tan \theta + 2t$, where t represents a thickness of each of the pair seal lip members, $\delta$ represents an elastic deformation of each of the pair of seal lip members, C is a position of a pressed point from an end of each of pair of seal lip members, and $\theta$ represents an opening angle between the pair of seal lip members.

4. The scale device as set forth in claim 1, wherein each of the pair of seal lip members is formed from a low-friction, abrasion-resistant material.

5. The scale device as set forth in claim 1, wherein:

each of the pair of seal lip members is a convex portion formed integrally on the carrier unit; and a slit parallel to the pair of seal lip members is formed in a base end of each convex portion to make the carrier unit flexible in a pressing direction of the pair seal lip members.

6. The scale device as set forth in claim 1, wherein each of the pair of seal lip members is a roller bearing installed rotatably on the carrier unit.

7. The scale device as set forth in claim 1, wherein each of the pair of seal lip members is an elastic piece cantilevered at one end thereof by the carrier unit and a free end of the carrier unit presses an outer lateral side of each of the pair of seal lip members.

8. The scale device as set forth in claim 1, wherein there are formed on lateral sides, respectively, of the case member and carrier unit, opposite to each other, holding portions which are engaged to hold both the case member and the carrier unit.

* * * * *

UNITED STATES PATENT AND TRADEMARK OFFICE
CERTIFICATE OF CORRECTION

PATENT NO. : 6,935,043 B2
DATED : August 30, 2005
INVENTOR(S) : Gunichi Nakamura et al.

It is certified that error appears in the above-identified patent and that said Letters Patent is hereby corrected as shown below:

<u>Title page,</u>
Item [54], Title, replace "THE OCCURENCE OF SMALL GAPS" with
-- THE OCCURRENCE OF SMALL GAPS --.

Signed and Sealed this

Twenty-fifth Day of October, 2005

JON W. DUDAS
*Director of the United States Patent and Trademark Office*